US010605142B2

(12) United States Patent
Grosch et al.

(10) Patent No.: US 10,605,142 B2
(45) Date of Patent: Mar. 31, 2020

(54) METHODS AND SYSTEMS FOR AN EXHAUST AFTERTREATMENT DEVICE

(71) Applicant: Ford Global Technologies, LLC, Dearborn, MI (US)

(72) Inventors: Guenter Hans Grosch, Vettweiss (DE); Felix Goebel, Aachen (DE); Richard Fritsche, Herzogenrath (DE); Rainer Lach, Wuerselen (DE); Franz Weber, Sinzig (DE)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 15/421,088

(22) Filed: Jan. 31, 2017

(65) Prior Publication Data

US 2017/0218824 A1 Aug. 3, 2017

(30) Foreign Application Priority Data

Feb. 2, 2016 (DE) .................. 10 2016 201 557

(51) Int. Cl.
| | |
|---|---|
| *F01N 3/28* | (2006.01) |
| *F23G 7/07* | (2006.01) |
| *F01N 3/021* | (2006.01) |
| *F01N 3/08* | (2006.01) |
| *F01N 3/10* | (2006.01) |

(52) U.S. Cl.
CPC ............ *F01N 3/2892* (2013.01); *F01N 3/021* (2013.01); *F01N 3/0835* (2013.01); *F01N 3/0842* (2013.01); *F01N 3/101* (2013.01); *F01N 3/103* (2013.01); *F23G 7/07* (2013.01); *Y02T 10/22* (2013.01)

(58) Field of Classification Search
CPC . F01N 3/02; F01N 3/021; F01N 3/033; F01N 3/035; F01N 3/20; F01N 3/2066; F01N 3/101; F01N 3/103; F01N 3/28; F01N 3/2892; F01N 3/0835; F01N 3/0842; F01N 13/009; F01N 13/0097
USPC .......................................... 60/772
See application file for complete search history.

(56) References Cited

U.S. PATENT DOCUMENTS

| | | | |
|---|---|---|---|
| 6,065,957 A | 5/2000 | Kondo et al. | |
| 6,312,650 B1 * | 11/2001 | Frederiksen | ....... B01D 53/9431 181/264 |
| 7,210,287 B2 | 5/2007 | Bolander et al. | |
| 7,900,443 B2 | 3/2011 | Stieglbauer | |
| 9,341,096 B2 * | 5/2016 | Brueck | ............... F01N 13/1805 |
| 2004/0040782 A1 * | 3/2004 | Frederiksen | .............. F01N 1/04 181/258 |
| 2010/0107613 A1 * | 5/2010 | Masuda | ................. B01D 46/24 60/297 |

(Continued)

FOREIGN PATENT DOCUMENTS

DE 202015106054 U1 11/2015

*Primary Examiner* — Mark A Laurenzi
*Assistant Examiner* — Loren C Edwards
(74) *Attorney, Agent, or Firm* — Geoffrey Brumbaugh; McCoy Russell LLP (57) ABSTRACT

Systems are provided for an exhaust gas aftertreatment device, in particular in a motor vehicle, having a catalyst accommodated in a housing which, along its length, has a first end section, a catalyst section, and a connecting section. The housing further comprising a particulate filter located downstream of the catalyst.

5 Claims, 2 Drawing Sheets (56) References Cited

U.S. PATENT DOCUMENTS

2013/0276438 A1* 10/2013 De Rudder ............... F01N 3/00
60/324
2015/0037219 A1* 2/2015 Moran ................... F01N 3/103
422/171

* cited by examiner

METHODS AND SYSTEMS FOR AN EXHAUST AFTERTREATMENT DEVICE

CROSS REFERENCE TO RELATED APPLICATIONS

This application claims priority to German Patent Application No. 102016201557.5, filed on Feb. 2, 2016. The entire contents of the above-referenced application are hereby incorporated by reference in its entirety for all purposes.

FIELD

The present description relates generally to methods and systems an exhaust gas aftertreatment device, in particular in a motor vehicle, having a catalyst, which is accommodated in a housing which, along its length, has a first end section, a catalyst section and a connecting section, and to an arrangement of an exhaust gas aftertreatment device of this kind in a motor vehicle.

BACKGROUND/SUMMARY

Exhaust gas aftertreatment devices by means of which it is possible to comply with the limits prescribed by future exhaust standards for the pollutant emissions of motor vehicles having an internal combustion engine have a larger overall volume than previous systems and, accordingly, use more space in the vehicle.

At the same time, there are increasingly strict regulations in respect of crash safety and pedestrian protection, to satisfy which new structures or empty spaces in the vehicle are necessary, and these likewise take up space. Structures which may improve crash safety are, for example, auxiliary frames or subframes, in particular "X members". Empty spaces for pedestrian protection are, in particular, minimum clearances between an engine hood and any other inflexible internal equipment fitted in the engine compartment.

In the case of modern internal combustion engines, the aim is to arrange an exhaust gas aftertreatment device having a catalyst and a particulate filter in the engine compartment, e.g. underneath an exhaust turbocharger. However, it may be too close there to various components for crash safety or brake boosting and, on the other hand, the space above the exhaust gas aftertreatment device cannot be used for any other internal equipment owing to the waste heat of said device.

Other attempts to address vehicle space management include convoluting exhaust flow pathways through an aftertreatment device to increase a distance traveled without increasing an amount of space used by the aftertreatment device. One example approach is shown by Stieglbauer et al. in U.S. Pat. No. 7,900,443. Therein, a particulate filter having a central tubular part and two parts in the form of jackets surrounding the latter and one another, through which, in one embodiment, there is a backward and forward flow in a Z pattern to ensure that the particulate filter heats up rapidly during operation.

A second example approach is shown by Bolander et al. in U.S. Pat. No. 7,210,287. Therein, a vehicle catalyst of similar construction having Z-shaped flow paths from an inlet end to an opposite outlet end, allowing accelerated light off of the catalyst reaction.

A third example approach is shown by Kondo et al. in U.S. Pat. No. 6,065,957. Therein, a catalytic burner for heating or drying, having a pot-shaped housing, in which a hollow-cylindrical catalyst body is situated and at one axial end of which both an inlet opening for combustion air and an exhaust gas outlet opening are arranged. Here, the gas flow through the housing is in a U shape since the gas flows through the cavity in the catalyst body, is then deflected through 180° and then flows through the actual hollow-cylindrical catalyst body.

However, the inventors herein have recognized potential issues with such systems. As one example, exhaust temperatures are desired to be lower due to new emissions standards, which may not rapidly heat the catalyst during cold-starts. Additionally, packaging of the catalysts described above does not sufficiently decrease packaging restraints of the catalyst. As such, a catalytic mass of the catalytic device may be compromised.

It is the underlying object of the present disclosure to specify an exhaust gas aftertreatment device and an arrangement thereof in a motor vehicle, the catalyst of which can be heated up particularly quickly and uniformly during operation and with which the space available in the engine compartment can be increasingly utilized.

In one example, the issues described above may be addressed by an exhaust gas aftertreatment device of a motor vehicle, comprising a catalyst, which is accommodated in a tubular housing which, along its length, has a first end section, a catalyst section, and a connecting section, wherein exhaust gas flows to the connecting section in a direction perpendicular to a central axis of the aftertreatment device, where the exhaust gas flow is divided to flow a first portion centrally to the catalyst and a second portion around the catalyst, wherein the portions are deflected 180° and combined in the first end section, and where the combined portions flow through the catalyst from the first end section to the connecting section. In this way, exhaust gas may warm-up the catalyst before flowing therein.

As one example, the exhaust gas aftertreatment device is designed in such a way that the exhaust gas to be treated enters the exhaust gas aftertreatment device in a region of a connecting section and then a part thereof flows centrally through the catalyst and another part thereof flows around the catalyst at the circumference thereof, wherein the two part flows flowing in the same direction are deflected through 180° and more or less recombined in the first end section and then flow through the catalyst from the end section to the connecting section.

In the present disclosure, the catalyst body is heated both from the inside and from the outside by exhaust gases, wherein both part flows have the same maximum temperature. As a result, the catalyst body can heat up particularly quickly and uniformly during operation, thereby making it possible to satisfy the light off conditions of the exhaust gas aftertreatment device more easily, even with the lower exhaust gas temperatures that are nowadays desired.

Moreover, the U-shaped deflection of the exhaust gases in the catalyst enables the catalyst to be arranged in an engine compartment, namely above an exhaust gas outlet opening of the internal combustion engine, in particular the exhaust gas outlet opening of an exhaust turbocharger. As a result, a region in the engine compartment may be used for the catalyst and/or more volume can be made available for catalytically active material.

Moreover, the catalyst and the housing accommodating the latter can have a relatively short overall length owing to the heating from the inside and from the outside, wherein the tubular housing is pot-shaped, e.g., it resembles a fairly short pipe section closed at one end, the cross section of which will generally be circular but can also be elliptical or polygonal, for example. The small overall length makes it easier to accommodate the catalyst above the exhaust gas outlet opening.

Moreover, there is more space available underneath the exhaust gas outlet opening for additional exhaust gas aftertreatment, e.g. in a particulate filter.

In a corresponding embodiment of the present disclosure, the housing is divided along its length into the end section, the catalyst section, in which the catalyst is accommodated, the connecting section, a particulate filter section, in which a particulate filter arranged downstream of the catalyst is accommodated, and a second end section having a gas outlet opening, wherein the exhaust gas flowing through the catalyst to the connecting section flows in the direction of the particulate filter and then flows through the particulate filter in the direction of the second end section.

In contradistinction to exhaust gas aftertreatment devices known in the art, having a catalyst and a particulate filter in an elongate housing, at one end of which the exhaust gas enters, flows more or less in a straight line through the catalyst and then the particulate filter and then emerges at the other end of the housing, the gas inlet opening in the present disclosure can be situated spatially between the catalyst and the particulate filter, thus allowing the catalyst to be arranged above and the particulate filter below an exhaust gas outlet opening of the internal combustion engine, in particular above and below an exhaust gas outlet opening of an exhaust turbocharger arranged on an exhaust manifold of the internal combustion engine. In this way, the space above the exhaust gas outlet opening is used for the catalyst, and all that extends below this is the particulate filter section of the exhaust gas aftertreatment device, and therefore space is also gained below the exhaust gas outlet opening.

The U-shaped deflection of the exhaust gases in the catalyst and the close coupling of the catalyst and particulate filter in a common housing furthermore have the advantage that the catalyst and the particulate filter both heat up more quickly and more intensively during operation than in separate housings, thereby making it possible to satisfy light-off conditions thereof more easily, even with lower exhaust gas temperatures.

In an embodiment of the present disclosure, the catalyst has a central tubular part, a jacket radially surrounding the central tubular part and through which a part of the exhaust gas flowing in from the gas inlet opening flows centrally, and an outer flow part, which radially surrounds the part in the form of a jacket and through which the other part of the exhaust gas flowing in from the gas inlet opening flows at the circumference of the catalyst, wherein these three parts each extend in the longitudinal direction of the exhaust gas aftertreatment device and are in flow connection with one another in the first end section.

In this case, the exhaust gas aftertreatment device can have a gas inlet opening which is arranged in the region of the connecting section and is in flow connection with the ends, remote from the first end section, both of the central tubular part and of the outer flow part of the catalyst.

The flow connection between the gas inlet opening and the ends, remote from the first end section, of the central tubular part and of the outer flow part of the catalyst can be formed by a pipe which passes through a side wall of the connecting section transversely to the longitudinal direction of the exhaust gas aftertreatment device.

Like the outer flow part, the central tubular part of the catalyst can be hollow. As an alternative, the central tubular part may comprise a catalytically active material, like the catalyst part in the form of a jacket, said material being supported in a known manner by a honeycomb body or some other substrate, for example.

In a common housing for the catalyst and the particulate filter, the catalyst part in the form of a jacket, namely the downstream end thereof, can be in direct flow connection with the particulate filter, namely with the upstream end thereof, in the connecting section, thus enabling the catalyst to preheat the particulate filter more directly.

In particular, the catalyst can be an oxidation catalyst or a NOx storage catalyst, and an injector, e.g. an injector for injecting a chemical for selective catalytic reduction (SCR), can furthermore be arranged in the region of the connecting section. Such an injector comprises a certain overall length, and it poses the least interference in the region of the connecting section if it projects outward from the housing wall.

As already mentioned, the exhaust gas aftertreatment device according to the present disclosure is suitable particularly for motor vehicles having an internal combustion engine, wherein the catalyst section is arranged substantially above and the particulate filter section substantially below an exhaust gas outlet opening of the internal combustion engine, and it is suitable particularly for attachment to turbocharged internal combustion engines, wherein said exhaust gas outlet opening is the exhaust gas outlet opening of the exhaust turbocharger, and the connecting section is arranged approximately at the level of the exhaust turbocharger in the engine compartment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-5 are shown approximately to scale.

DETAILED DESCRIPTION

Figure 1:
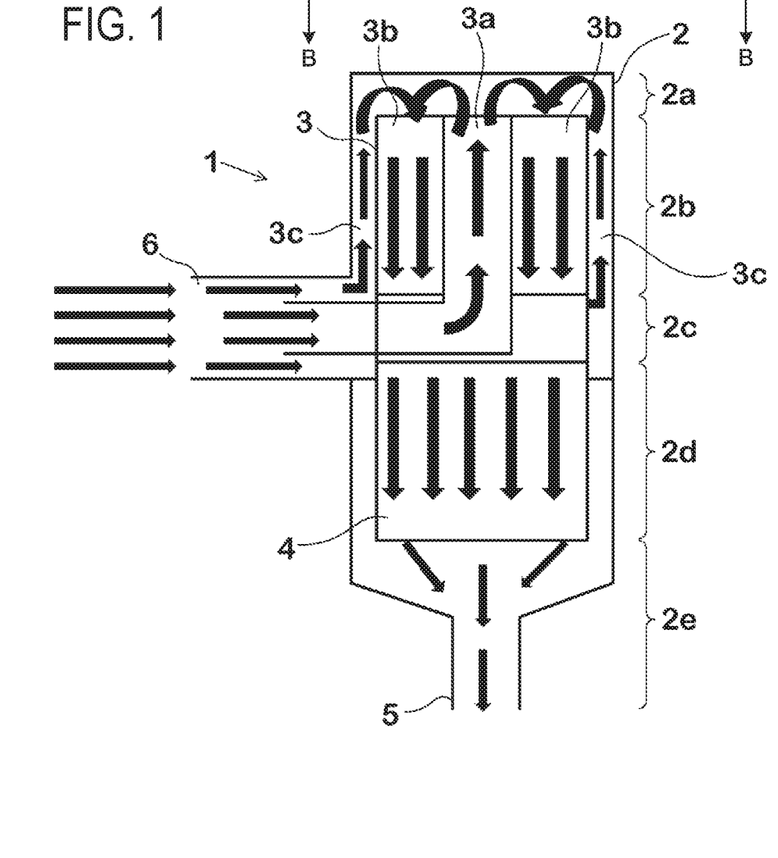
FIG. 1 shows a schematic longitudinal section through an exhaust gas aftertreatment device having a catalyst and a particulate filter.
Figure 2:
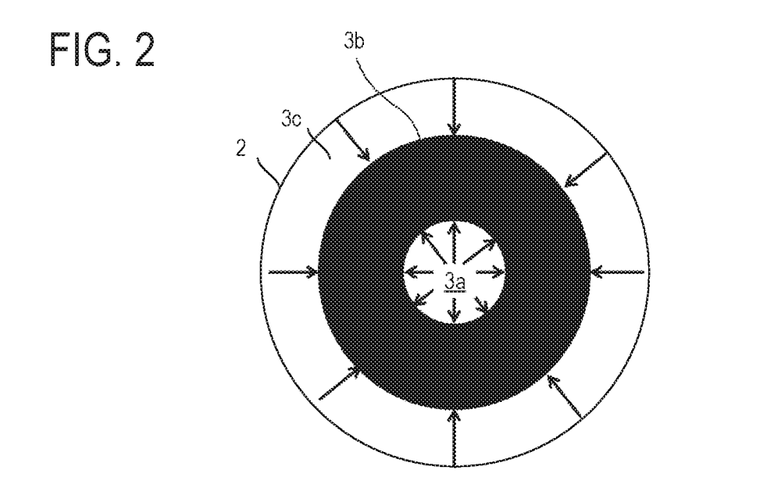
FIG. 2 shows a schematic partial cross section through the catalyst.
Figure 3A:
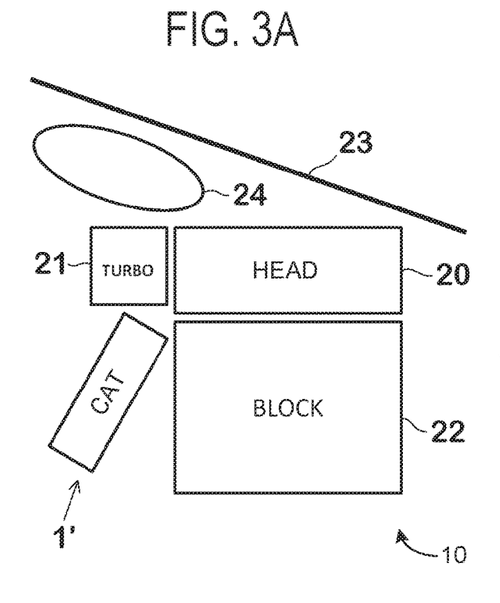
FIG. 3A shows a schematic longitudinal section through the engine compartment of a motor vehicle comprising an exhaust aftertreatment device of the above described references.
Figure 3B:
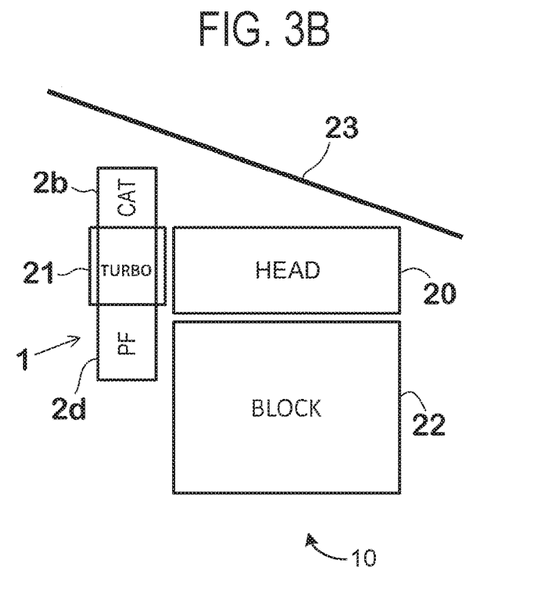
FIG. 3B shows a schematic longitudinal section through the engine compartment of a motor vehicle comprising an exhaust aftertreatment device of the present disclosure.
Figure 4:
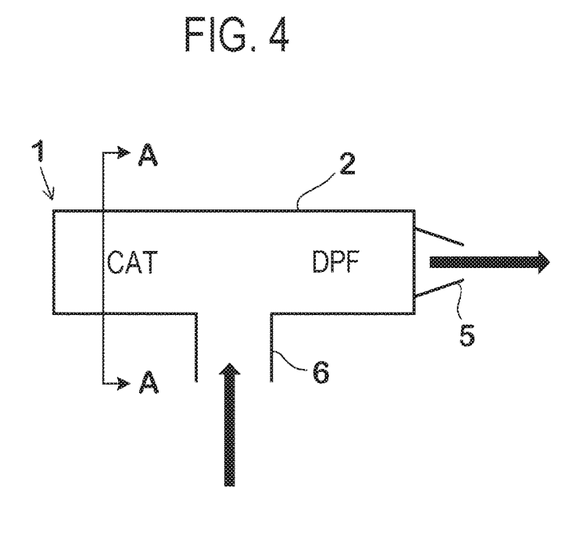
FIG. 4 shows a more schematic longitudinal section through the exhaust gas aftertreatment device.
Figure 5:
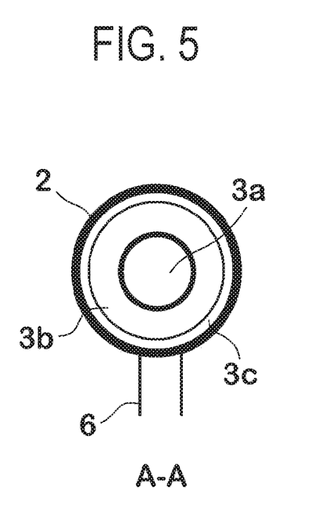
FIG. 5 shows a cross-section along the line A-A.

The following description relates to systems and methods for an exhaust gas aftertreatment device. A catalyst and particulate filter are located in an exhaust gas aftertreatment housing. The catalyst is a toroid with a central passage located in its central opening and an outer passage located between the catalyst and the aftertreatment housing. Exhaust gas from an exhaust gas outlet flows into the central and outer passages before flowing into the catalyst, as shown in FIG. 1. As exhaust gas flows through the passages in a first direction, the exhaust gas warms up the catalyst before flowing therein, as shown in FIG. 2. Exhaust gas flows out of the central and outer passages into a first end of the housing, where the exhaust gases may mix before flowing through the catalyst in a second direction. In one example, the second direction is opposite the first direction such that exhaust gas flow in the housing is substantially U-shaped. By configuring the catalyst and particulate filter in the housing this way, the aftertreatment device is located in an engine compartment adjacent a turbocharger, as shown in FIG. 3B. By doing this, space that is otherwise unused, as shown in FIG. 3A, may be utilized. An exhaust gas outlet of the turbocharger intersects the aftertreament device housing at a located between the catalyst and the particulate filter, as shown in FIG. 4. FIG. 5 depicts an illustration of a cutting plane taken in FIG. 4 of the aftertreatment device housing.

Thus, the figures illustrate an exhaust gas aftertreatment device of a motor vehicle, comprising a catalyst, which is accommodated in a tubular housing which, along its length, has a first end section, a catalyst section, and a connecting section, wherein exhaust gas flows to the connecting section in a direction perpendicular to a central axis of the aftertreatment device, where the exhaust gas flow is divided to flow a first portion centrally to the catalyst and a second portion around the catalyst, wherein the portions are deflected 180° and combined in the first end section, and where the combined portions flow through the catalyst from the first end section to the connecting section.

The housing is divided along its length into the end section, the catalyst section, in which the catalyst is accommodated, the connecting section, a particulate filter section, in which a particulate filter arranged downstream of the catalyst is accommodated, and a second end section having a gas outlet opening, wherein the exhaust gas flowing through the catalyst to the connecting section flows in the direction of the particulate filter and then flows through the particulate filter in the direction of the second end section.

The catalyst comprises a central tubular part, a part in the form of a jacket, which radially surrounds the central tubular part and through which a part of the exhaust gas flows centrally, and an outer flow part, which radially surrounds the part in the form of a jacket and through which the other part of the exhaust gas flows at the circumference of the catalyst, wherein these three parts each extend in the longitudinal direction of the exhaust gas aftertreatment device, are concentric about the central axis of the aftertreatment device, and are fluidly coupled with one another via the first end section. The exhaust gas aftertreatment device has a gas inlet opening which is arranged in the region of the connecting section and is fluidly coupled with the central tubular part and of the outer flow part of the catalyst distal to the first end section. The fluid coupling between the gas inlet opening and the central tubular part and the outer flow part of the catalyst is formed by a pipe which passes through a side wall of the connecting section perpendicularly to the central axis of the aftertreatment device. The part of the catalyst in the form of a jacket comprises a catalytically active material. The catalytically active material is fluidly coupled with the particulate filter via the connecting section.

The catalyst section is arranged above an exhaust gas outlet, further comprising a particulate filter section located below the exhaust as outlet. The exhaust gas outlet opening is the exhaust gas outlet opening of an exhaust turbocharger of the internal combustion engine, wherein the connecting section is arranged approximately at the level of the exhaust turbocharger in the engine compartment along a central axis of the exhaust gas outlet, the central axis of the exhaust gas outlet being perpendicular to the central axis of the aftertreatment device.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, an exhaust gas aftertreatment device 1 contains an elongate housing 2, which is divided in succession into a first end section 2a, a catalyst section 2b, a connecting section 2c, a particulate filter section 2d and a second end section 2e.

A catalyst 3 is accommodated in the catalyst section 2b of the housing 2, and a particulate filter 4 is accommodated in the particulate filter section 2d of the housing 2. The connecting section 2c connects the catalyst section 2b to the particulate filter section 2d and allows exhaust gas which has flowed through the catalyst 3 to flow into the particulate filter 4. After the exhaust gas has flowed through the particulate filter 4, it flows out of a gas outlet opening 5 in the second end section 2e of the exhaust gas aftertreatment device 1.

The catalyst 3 contains a central tubular part 3a and a part 3b in the form of a jacket radially surrounding the central part, said parts each extending in the longitudinal direction of the exhaust gas aftertreatment device and being in flow connection with one another within the first end section 2a.

The catalyst 3 is one or more of a three-way catalyst, diesel oxidation catalyst, nitrogen oxide trap, and hydrocarbon trap.

The part 3b of the catalyst 3 in the form of a jacket and possibly also the central tubular part 3a of said catalyst each contain a catalytically coated honeycomb body. The catalyst 3 is fixedly coupled in the housing 2 via one or more supports, welds, fusions, adhesives, and screws.

Between the outer circumference of the part 3b of the catalyst 3 in the form of a jacket and the housing 2 there is a gap surrounding part 3b, said gap forming an outer flow part 3c, which is in flow connection with parts 3a and 3b via the first end section 2a and can be more or less hollow.

The exhaust gas aftertreatment device 1 furthermore contains a gas inlet elbow pipe 6, which passes vertically through the wall of the housing 2 from the outside in the region of the connecting section 2c and which opens into the lower, downstream ends both of the central tubular part 3a and of the outer flow part 3c of the catalyst 3. This means that the exhaust gas flow path branches in the connecting section 2c in such a way that a part of the exhaust gas passed into the elbow pipe 6 flows through the part 3b of the catalyst 3 in the form of a jacket and another part of the exhaust gas flows around the catalyst 3 at the circumference thereof, wherein both part flows have the same direction.

In succession, a part of the exhaust gas flowing into the elbow pipe 6 from the outside thus flows through the central tubular part 3a of the catalyst 3, and another portion thereof flows through the outer flow part 3c, around the part 3b in the form of a jacket. In the end section 2a, the two exhaust gas part flows are deflected through 180° and more or less combined, and then flow through the part 3b of the catalyst 3 in the form of a jacket, the connecting section 2a and the particulate filter 4, as indicated by flow arrows in FIG. 1. As shown, the connecting section 2c is hermetically sealed from the catalyst region 3b and the particulate filter 4. As such, exhaust gas flowing from the catalyst region 3b to the particulate filter 4 does not mix with exhaust gas in the connecting section 2c.

In this way, the exhaust gas aftertreatment device 1 comprises the elongated housing 2 with the elbow pipe 6 extending therefrom. In one example, a central axis 7 of the elbow pipe 6 perpendicularly intersects a central axis 8 of the housing 2. The elbow pipe 6 directs exhaust gas to the central tubular part 3a and/or central passage 3a. Additionally, the elbow pipe directs exhaust gas to the outer flow part 3c and/or outer passage 3c. In one example, the central passage 3a is configured to receive a greater amount of exhaust gas than the outer passage 3c. Exhaust gas flows through the central 3a and outer 3c passages before merging in the first end section 2a and flowing into the catalyst section 3b. In this way, exhaust gas flows around the catalyst section 3b before entering the catalyst section 3b. As shown, the central passage 3a, the catalyst section 3b, and the outer passage 3c are concentric about the central axis 8. As such, exhaust gas may flows next to inner and outer regions of the catalyst section 3b before entering the catalyst section 3b at an end adjacent the first end section 2a. Exhaust gas flow through the catalyst section 3b in a direction parallel to a radially spaced away from the central axis 8. Exhaust gas flows through the connecting section 3c and/or gap 3c before entering the particulate filter 4. In one example, the particulate filter 4 is in face-sharing contact with the catalyst region 3b and the connecting section 3c is omitted. Exhaust gas flows through the outlet opening 5 to either an ambient atmosphere or remained of an exhaust tract after flowing through the particulate filter 4.

FIG. 2 is a schematic partial cross section along cutting plane B-B of FIG. 1 taken along the central axis 8 of the housing 2. As shown, the housing 2 is cylindrical with central passage 3a located along its geometric center. Outer passage 3c is located adjacent to the housing 2. The catalyst region 3b of the catalyst 3 is sandwiched between the central 3a and outer 3c passages. The catalyst region 3b is filled in black to indicate that it is not hollow, while the central 3a and outer 3c passages are filled in white to indicate that they are hollow. Arrows in the embodiment of FIG. 2 show a direction of heat transfer as exhaust gas flows through the central 3a and outer 3c passages. As shown, heat flows radially outward from the central passage 3a to the catalyst region 3b, while heat flows radially inward from the outer passage 3c to the catalyst region 3b.

In this way, the catalyst region 3b is hermetically sealed from the central 3a and outer 3c passages in the radial direction. Thus, the catalyst region 3b does not receive exhaust gas in the radial direction. However, the catalyst region 3b does receive thermal energy and/or heat in the radial direction. Exhaust gas flows out of the central 3a and outer 3c passages and into the first end section 2a in a first direction parallel to the central axis 8, where the exhaust gas mixes before flowing into the catalyst region 3b in a second direction parallel to the central axis 8. As such, the first and second directions are opposite one another.

Thus, a cylindrical aftertreatment housing comprises inner and outer hollow flow regions radially spaced about a catalyst region, the flow regions are configured to transfer heat in a radial direction to the catalyst region. Specifically, heat from exhaust gas in the central passage flows radially outward to the catalyst, and where heat from exhaust gas in the outer passage flows radially inward to the catalyst. Each of the central, catalyst, and outer regions are cylindrical with a circular cross-section. An inlet to the catalyst region is located at a gap located at an extreme end of the housing and the central, catalyst, and outer regions. Exhaust gas flows out of the central and outer regions, merges in the gap, and flows into the catalyst. By doing this, a direction of exhaust gas flow in the central and outer regions is opposite to a direction of exhaust gas flow in the catalyst region. As such, exhaust gas turns in an 180° direction when flowing from the central and outer regions, into the gap, and to the catalyst region. The aftertreatment device further comprises a particulate filter located downstream of the catalyst region. A tube is physically coupled to the housing and fluidly coupled to the central and outer regions at a location between the catalyst region and the particulate filter. In one example, the tube is an elbow tube. In some examples, additionally or alternatively, the tube is a turbine outlet and the housing is stacked across the turbocharger such that the catalyst region is one a first side of the turbocharger and the particulate filter is on a second, opposite side of the turbocharger.

Turning now to FIG. 3A, it shows a schematic longitudinal section through the engine compartment of a motor vehicle, in which an exhaust gas aftertreatment device 1', similar to an aftertreatment device used in the references described above, which can contain a catalyst (CAT) and optionally also a particulate filter (PF; diesel particulate filter), leads downward past the side of an engine block 22 from a turbocharger 21 arranged next to a cylinder head 20 of an internal combustion engine and, in the process, extends virtually over the entire height of the engine block 22.

Turning now to FIG. 3B, it shows a schematic longitudinal section through the engine compartment of a motor vehicle, in which an exhaust gas aftertreatment device 1 like that in FIG. 1 is arranged at the side of the turbocharger 21 and is connected thereto by the elbow pipe 6. As shown, the catalyst section 2b of the exhaust gas aftertreatment device 1 is situated above the turbocharger 21, and the particulate filter section 2d is situated below said turbocharger, with the result that space is gained underneath the particulate filter section 2d.

In FIGS. 3A and 3b, a sloping line 23 indicates a pedestrian protection line, e.g., a line which runs at a certain distance from an engine hood (not shown) and below which there should be no inflexible internal fittings in the engine compartment.

Since an engine hood usually slopes to a greater or lesser extent, as therefore also does the pedestrian protection line 23, the exhaust gas aftertreatment device 1', sued by the references described above, leaves unusable space above the turbocharger 21, this being outlined by an ellipse 24 in FIG. 3A. This unusable space increases a packaging restraint of the vehicle. Furthermore, the unusable space increases thermal losses through surfaces of the engine 10 and the turbo 21. As shown in FIG. 3B, the exhaust gas aftertreatment device 1 utilizes the unused space indicated in FIG. 3A. As such, usable space is created below the PF 2d and behind the engine block 22. Additionally, the arrangement allows heat dissipated from the block 22 and head 20 to heat the aftertreatment device 1.

Thus, a system, comprises a turbocharged engine and an aftertreatment device housing comprising a catalyst upstream of a particulate filter relative to a direction of exhaust gas flow, and where a gap is located between the catalyst and particulate filter; where the catalyst is a toroid having a largest diameter less than a diameter of the aftertreatment device housing, and where a central passage is located through an opening of the toroid along a central axis of the housing and where an outer passage is located between the housing and the largest diameter of the catalyst.

The gap is fluidly coupled to an exhaust gas outlet of a turbocharger, and where the housing is arranged such that the catalyst is vertically higher than the turbocharger and the particulate filter is vertically lower than the turbocharger, the gap being vertically equal to the turbocharger. The central passage, catalyst, and outer passage are fluidly coupled to a first end section located at a vertically highest portion of the housing, and where the first end section receives exhaust gas from the central and outer passages flowing in a first direction and where the first end section direct exhaust gas to the catalyst in a second direction, where the second direction is opposite the first direction.

Turning now to FIG. 4, it shows the arrangement of the exhaust gas aftertreatment device 1 in the engine compartment of a motor vehicle having an internal combustion engine, which shows the exhaust gas aftertreatment device 1 horizontally. The elbow pipe 6 is connected directly to an exhaust gas outlet opening of an exhaust turbocharger of the internal combustion engine (e.g., turbocharger 21 of engine 10 of FIG. 3B). Thus, the catalyst section (CAT) is arranged substantially above (on the left of line A-A in FIG. 4) the exhaust turbocharger, and the particulate filter section (PF) is arranged substantially below said turbocharger. The connecting section between the catalyst and the particulate filter, into which the exhaust gas flowing in from the exhaust turbocharger in the direction of the arrow enters first, lies approximately at the level of the exhaust turbocharger in the engine compartment, and the gas outlet opening 5 expediently points downward to guide the exhaust gas in the arrow direction indicated to any further exhaust gas aftertreatment device or to a tailpipe.

Thus, a system comprising a catalyst sandwiched by a central passage and an outer passage in an aftertreatment housing, where the central passage traverses an entire height of the catalyst along a central axis of the aftertreatment housing and where the outer passage traverses an entire height of the catalyst along a greatest diameter of the catalyst, an exhaust outlet of a turbocharger fluidly coupled to the central and outer passages, and a particulate filter located in the aftertreatment housing in a location below the catalyst and the turbocharger. The exhaust gas outlet intersects the aftertreatment housing at a location between the catalyst and the particulate filter.

The system further comprises flowing exhaust gas to aftertreament device from the exhaust gas outlet in a direction perpendicular to the central axis of the aftertreament housing, the exhaust gas turning in a first direction parallel to the central axis upon entering one or more of the central and outer passages, flowing the exhaust gas through the passages to a first end of the aftertreatment device, wherein the exhaust gas from the passages merges in the first end before flowing in a second direction parallel to the central axis, through the catalyst, and toward the particulate filter adjacent a second end. The first direction is opposite to the second direction. The catalyst comprises no other inlets other than those fluidly coupling the catalyst to the first end.

FIG. 5 is a cross section along the cutting plane A-A in FIG. 4. The housing 2 is expediently thermally insulated, as illustrated here by a thicker circular line, in order to minimize heat losses to the outside. The thermal insulation can be achieved by double-walled embodiment, air gap insulation, and/or heat insulating materials, for example. Although not shown, the particulate filter (e.g., particulate filter 4) is cascaded behind the catalyst 3 within the housing 2. In some examples, the housing is not insulated and heat from the engine may heat the housing 2 and/or the catalyst 3.

In this way, an exhaust gas aftertreatment device is configured to utilize unused spaces in an engine compartment by cascading a catalyst and particulate filter in an aftertreatment housing. Passages are located in the housing and are configured to flow exhaust gas substantially in a U-shape toward the catalyst before flowing the exhaust gas to the particulate filter. The technical effect of placing the aftertreatment device in the engine compartment and flowing exhaust gas in a U-shape is to warm-up the catalyst more quickly during a cold-start. As such, heat is transferred radially inwards and outwards to the catalyst during combustion events. Additionally, due to the configuration of the aftertreatment device, the aftertreatment device may be arranged on the turbocharger, thereby utilizing space that is otherwise unused in the engine compartment. By doing this, space is created for additional vehicle components and/or devices.

An example of an exhaust gas aftertreatment device of a motor vehicle, comprising a catalyst, which is accommodated in a tubular housing which, along its length, has a first end section, a catalyst section, and a connecting section, wherein exhaust gas flows to the connecting section in a direction perpendicular to a central axis of the aftertreatment device, where the exhaust gas flow is divided to flow a first portion centrally to the catalyst and a second portion around the catalyst, wherein the portions are deflected 180° and combined in the first end section, and where the combined portions flow through the catalyst from the first end section to the connecting section. A first example of the device further includes where the housing is divided along its length into the end section, the catalyst section, in which the catalyst is accommodated, the connecting section, a particulate filter section, in which a particulate filter arranged downstream of the catalyst is accommodated, and a second end section having a gas outlet opening, wherein the exhaust gas flowing through the catalyst to the connecting section flows in the direction of the particulate filter and then flows through the particulate filter in the direction of the second end section. A second example of the device, optionally including the first example, further includes where the catalyst comprises a central tubular part, a part in the form of a jacket, which radially surrounds the central tubular part and through which a part of the exhaust gas flows centrally, and an outer flow part, which radially surrounds the part in the form of a jacket and through which the other part of the exhaust gas flows at the circumference of the catalyst, wherein these three parts each extend in the longitudinal direction of the exhaust gas aftertreatment device, are concentric about the central axis of the aftertreatment device, and are fluidly coupled with one another via the first end section. A third example of the device, optionally including the first and/or second examples, further includes where the exhaust gas aftertreatment device has a gas inlet opening which is arranged in the region of the connecting section and is fluidly coupled with the central tubular part and of the outer flow part of the catalyst distal to the first end section. A fourth example of the device, optionally including one or more of the first through third examples, further includes where the fluid coupling between the gas inlet opening and the central tubular part and the outer flow part of the catalyst is formed by a pipe which passes through a side wall of the connecting section perpendicularly to the central axis of the aftertreatment device. A fifth example of the device, optionally including one or more of the first through fourth examples, further includes where the part of the catalyst in the form of a jacket comprises a catalytically active material. A sixth example of the device, optionally including one or more of the first through fifth examples, further includes where the catalytically active material is fluidly coupled with the particulate filter via the connecting section. A seventh example of the device, optionally including one or more of the first through sixth examples, further includes where the catalyst section is arranged above an exhaust gas outlet, further comprising a particulate filter section located below the exhaust as outlet. An eighth example of the device, optionally including one or more of the first through seventh examples, further includes where the exhaust gas outlet opening is the exhaust gas outlet opening of an exhaust turbocharger of the internal combustion engine, wherein the connecting section is arranged approximately at the level of the exhaust turbocharger in the engine compartment along a central axis of the exhaust gas outlet, the central axis of the exhaust gas outlet being perpendicular to the central axis of the aftertreatment device.

An example of a system, comprising a turbocharged engine, and an aftertreatment device housing comprising a catalyst upstream of a particulate filter relative to a direction of exhaust gas flow, and where a gap is located between the catalyst and particulate filter; where the catalyst is a toroid having a largest diameter less than a diameter of the aftertreatment device housing, and where a central passage is located through an opening of the toroid along a central axis of the housing and where an outer passage is located between the housing and the largest diameter of the catalyst. A first example of the system further includes where the gap is fluidly coupled to an exhaust gas outlet of a turbocharger, and where the housing is arranged such that the catalyst is vertically higher than the turbocharger and the particulate filter vertically lower than the turbocharger, the gap being vertically equal to the turbocharger. A second example of the system, optionally including the first example, further includes where the central passage, catalyst, and outer passage are concentric about the central axis of the housing. A third example of the system optionally including one or more of the first and second examples further includes where the central passage, catalyst, and outer passage are fluidly coupled to a first end section located at a vertically highest portion of the housing, and where the first end section receives exhaust gas from the central and outer passages flowing in a first direction and where the first end section direct exhaust gas to the catalyst in a second direction, where the second direction is opposite the first direction. A fourth example of the system, optionally including one or more of the first through third examples, further includes where the catalyst is one or more of a three-way catalyst, diesel oxidation catalyst, nitrogen oxide trap, and hydrocarbon trap. A fifth example of the system, optionally including one or more of the first through fourth examples, further includes where the housing is thermally insulated, and where heat from exhaust gas in the central passage flows radially outward to the catalyst, and where heat from exhaust gas in the outer passage flows radially inward to the catalyst.

Another example of a system comprising a catalyst sandwiched by a central and outer passages, where the central passage is located along a central axis of an aftertreatment housing and the outer passage is distal to the central axis, an exhaust outlet of a turbocharger fluidly coupled to the central and outer passages, and a particulate filter located in the aftertreatment housing in a location below the catalyst and the turbocharger. A first example of the system further includes where the exhaust gas outlet intersects the aftertreatment housing at a location between the catalyst and the particulate filter. A second example of the system, optionally including the first example, further includes where flowing exhaust gas to an aftertreament device from the exhaust gas outlet in a direction perpendicular to the central axis of the aftertreament housing, the exhaust gas turning in a first direction parallel to the central axis upon entering one or more of the central and outer passages, flowing the exhaust gas through the passages to a first end of the aftertreatment device, wherein the exhaust gas from the passages merges in the first end before flowing in a second direction parallel to the central axis, through the catalyst, and toward the particulate filter adjacent a second end. A third example of the system, optionally including one or more of the first and/or second examples, further includes where the first direction is opposite to the second direction. A fourth example of the system, optionally including one or more of the first through third examples, further includes where the catalyst comprises no other inlets other than those fluidly coupling the catalyst to the first end.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a turbocharged engine; and
an aftertreatment device housing comprising a catalyst upstream of a particulate filter relative to a direction of exhaust gas flow, and where a gap is located between the catalyst and particulate filter; where the catalyst is a toroid having a largest diameter less than a diameter of the aftertreatment device housing, and where a central passage is located through an opening of the toroid along a central axis of the aftertreatment device housing and where an outer passage is located between the aftertreatment device housing and the largest diameter of the catalyst, wherein the central passage, the catalyst, and the outer passage are fluidly coupled to a first end section located at a vertically highest portion of the aftertreatment device housing, and where the first end section receives exhaust gas from the central and outer passages flowing in a first direction and where the first end section directs exhaust gas to the catalyst in a second direction, where the second direction is opposite the first direction.

2. The system of claim 1, wherein the gap is fluidly coupled to an exhaust gas outlet of a turbocharger, and where the aftertreatment device housing is arranged such that the catalyst is vertically higher than the turbocharger and the particulate filter is vertically lower than the turbocharger, the gap being vertically equal to the turbocharger.

3. The system of claim 1, wherein the central passage, the catalyst, and the outer passage are concentric about the central axis of the aftertreatment device housing.

4. The system of claim 1, wherein the catalyst is one or more of a three-way catalyst, a diesel oxidation catalyst, a nitrogen oxide trap, and a hydrocarbon trap.

5. The system of claim 1, wherein the aftertreatment device housing is thermally insulated, and where heat from exhaust gas in the central passage flows radially outward to the catalyst, and where heat from exhaust gas in the outer passage flows radially inward to the catalyst.

* * * * *